Figure 1:
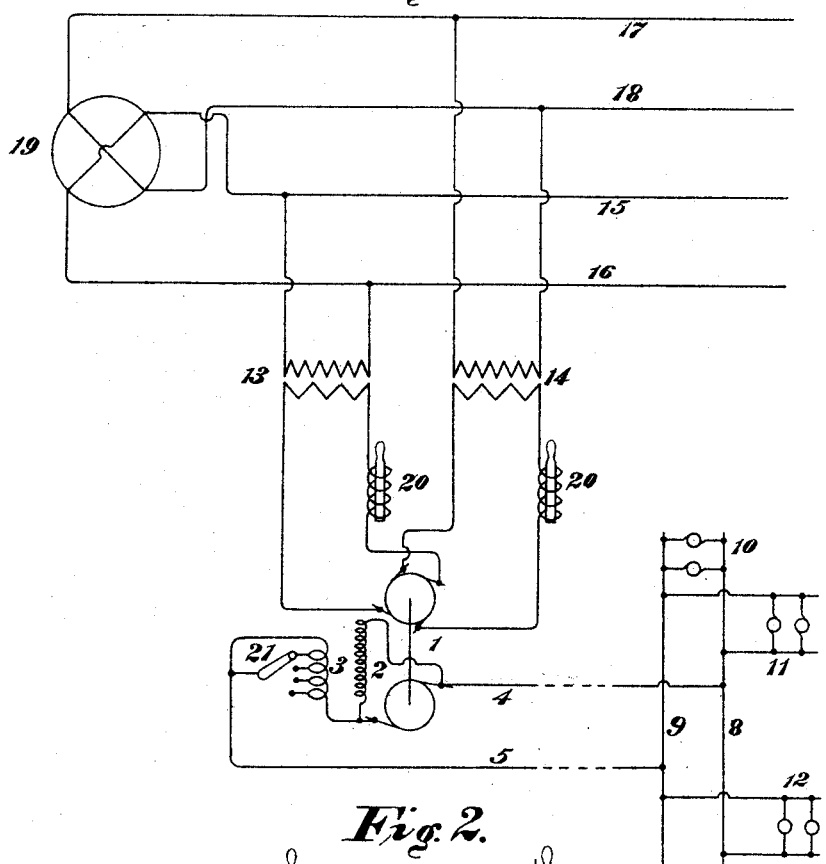

No. 620,343.  
R. D. MERSHON.  
ROTARY TRANSFORMER REGULATION.  
(Application filed Oct. 31, 1896.)  
(No Model.)

Patented Feb. 28, 1899.

WITNESSES:  
INVENTOR  
Ralph D. Mershon  
BY  
H. G. Carr  
ATTORNEY.

UNITED STATES PATENT OFFICE.

RALPH D. MERSHON, OF NEW YORK, N. Y., ASSIGNOR TO THE WESTINGHOUSE ELECTRIC AND MANUFACTURING COMPANY, OF PENNSYLVANIA.

ROTARY-TRANSFORMER REGULATION.

SPECIFICATION forming part of Letters Patent No. 620,343, dated February 28, 1899.

Application filed October 31, 1896. Serial No. 610,735. (No model.)

*To all whom it may concern:*

Be it known that I, RALPH D. MERSHON, a citizen of the United States, residing in New York, in the county and State of New York, have invented a new and useful Improvement in Rotary-Transformer Regulations, (Case No. 718,) of which the following is a specification.

My invention relates to systems of electrical distribution in which rotary transformers are employed for transforming electric alternating currents into direct currents for use in operating translating devices; and it has for its object to provide a means for and method of regulation whereby the electromotive force delivered to the direct-current circuit may be adjusted in accordance with the requirements of the load upon such circuit.

As the voltage at the direct-current end of a rotary transformer always bears a definite fixed relation to that at the alternating-current end, it is necessary to provide some means for varying the voltage supplied to the latter in order to vary the voltage at the former.

In carrying out my invention I employ a transformer the armature of which may have either one or a plurality of windings, as may be desired, and the field-magnet of which is provided with either shunt or series coils, or with both, or with a separately-excited winding. In the alternating-current circuit supplying the transformer I introduce inductive resistance, the amount of which will depend upon the possible variation of voltage desired.

It is possible by properly adjusting the field-magnet excitation of a rotary transformer forming part of a system such as is above described—that is to say, by increasing or decreasing the excitation from the point where the alternating current supplied to the transformer is in step with the electromotive force—to produce either a leading or a lagging component of greater or less magnitude, thus securing a higher or a lower electromotive force at the direct-current terminals than is secured when the excitation is so adjusted that the current supplied is in step with the electromotive force. The direct-current electromotive force may therefore be closely adjusted to any desired value within certain limits, depending upon the relative magnitude and adjustment of the various elements involved.

In the case of a shunt-wound machine the adjustment of the field-magnet excitation may be made by varying the resistance of the shunt-field by any suitable means.

In the case of a compound-wound machine the adjustment may be made by introducing resistance into the shunt-circuit or by varying the ampere-turns of the series winding either by cutting more or less of such winding into or out of circuit or by shunting more or less of the same. Both the shunt and the series winding may be regulated as indicated above, if desired.

In the case of a series-wound machine the desired adjustment may be effected by varying the number of ampere-turns by either of the methods above indicated in connection with the series coils of a compound-wound machine.

Figure 2:
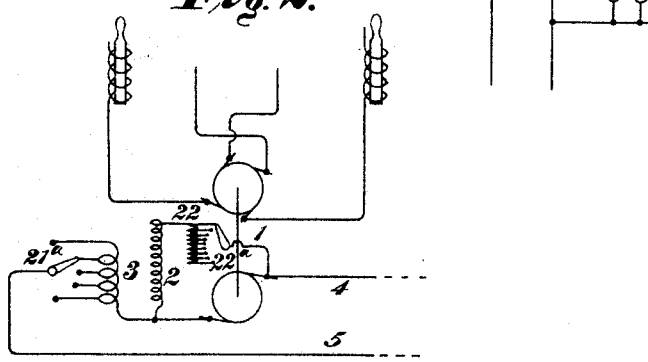

In the accompanying drawings, Figure 1 is a diagram of a system of distribution illustrative of my invention, and Fig. 2 is a similar view of a modified construction of the rotary transformer.

In the drawings, 1 is a rotary transformer, the armature of which may have one or more windings, as may be desired.

2 represents the shunt field-magnet winding, and 3 the series field-magnet winding.

4 and 5 are direct-current feeders supplying mains 8 and 9. Translating devices receiving current from said mains 8 and 9 are shown at 10, 11, and 12. Any other desired arrangement of translating devices and circuits may obviously be employed.

13 and 14 are stationary step-down transformers or converters, the primaries of which are respectively connected with the circuits 15 and 16 and 17 and 18, supplied with current from a two-phase generator 19. It will be understood that in cases where the generator potential is not too high the rotary transformer may be supplied directly therefrom without the interposition of step-down transformers.

In each alternating-current circuit supplied by the secondaries of the converters 13 and 14 or by the generator directly, as the case may be, is a choke-coil 20. These coils may, if desired, however, be included in the circuit supplying the primaries of the converters 13 and 14, and in some cases such converters may themselves contain sufficient inductive resistance to supply the necessary difference of potential between the generator and the rotary transformer. The inductive resistance represented by the choke-coils 20 may be adjusted for the particular organization of apparatus, and when once adjusted for any special case it may have a constant value. The self-induction of the choke-coils may, however, be adjusted so that large variations of voltage between the generator 19 and the rotary transformer 1 may be effected, thus varying the voltage at the direct-current terminals of the rotary transformer. My invention, however, does not particularly contemplate the adjustment of the inductive resistance represented by the coils 20; but it has particular reference to the adjustment of the field-magnet excitation of the rotary transformer. For the purpose of varying the ampere-turns of the field-magnet winding in order to vary the voltage at the direct-current terminals I have shown in Fig. 1 a switch 21, by means of which more or less of the series winding 3 may be shunted. This means of varying the ampere-turns may also be employed in connection with a machine having only a series winding, and hence I do not desire to limit the invention to a machine having the compound winding, as indicated in this figure of the drawings. In Fig. 2 I have also shown a shunt-winding 2 and a series winding 3 for the field-magnet and have shown a switch $21^a$ for varying the series ampere-turns by cutting more or less of the winding into or out of circuit. This arrangement is also obviously adapted to a machine having a series winding only. In this figure I have also shown an ohmic resistance 22 in series with the shunt-winding 2 and a switch $22^a$ for varying the amount of this resistance included in the circuit. This means of varying the field-magnet excitation may be employed, as will be readily understood, in connection with the shunt-wound machine as well as in the compound-wound machine, and it may be the sole means employed for varying the field-magnet excitation, or when used in a compound-wound machine, as indicated in Fig. 2, it may be employed in conjunction with means for shunting or cutting out portions of the series winding.

I have illustrated the invention as applied to a two-phase system of distribution; but it will be understood that it will be equally applicable to single-phase systems or to those having a greater number of phases than two.

Where choke-coils are employed, as will usually be necessary in order to secure the necessary inductive drop, they will be so proportioned that there will be no saturation of their cores under any conditions of working. As the inductive drop due to the choke-coils is diminished by the strengthening of the field for obtaining an increase of electromotive force and the current is brought more nearly into step with the electromotive force supplied by the rotary transformer, the direct-current circuit will be raised to the desired value. The inductive resistance and the field-coils of the transformer may be made or adjusted so that the current and electromotive force will be brought into step under any desired conditions of load, depending upon the condition of the plant in connection with which the invention is employed and the results sought to be secured.

I have not deemed it necessary to show a rotary transformer provided with means for separately exciting its field-magnets, as the adaptability of my invention thereto will be readily understood from the foregoing description.

I claim as my invention—

1. A system of electrical distribution comprising an alternating-current circuit containing inductive resistance, and a rotary transformer provided with adjusting means variable at will, whereby the field charge may be varied in accordance with the voltage desired at the direct-current terminals.

2. A system of electrical distribution comprising an alternating-current circuit provided with inductive resistance, and a rotary transformer provided with means for varying the ampere-turns of the field-magnet winding or windings in order to vary the electromotive force at the direct-current terminals.

3. A system of distribution comprising an alternating-current circuit containing inductive resistance and a shunt or compound wound rotary transformer provided with a resistance in series with the shunt-winding and with means for varying such resistance in order to secure the desired electromotive force at the direct-current terminals of the transformer.

4. The method of varying the electromotive force at the direct-current terminals of a rotary transformer which consists in establishing an inductive counter electromotive force between the transformer and the generator and varying the number of ampere-turns of the field-magnet winding or windings in accordance with the direct-current electromotive force desired.

In testimony whereof I have hereunto subscribed my name this 10th day of October, A. D. 1896.

RALPH D. MERSHON.

Witnesses:
PAUL N. NUNN,
W. ROBINSON.